United States Patent Office 3,772,238
Patented Nov. 13, 1973

3,772,238
GLAZING COMPOSITION
Laurence A. Malone, 2111 Jefferson Davis Highway,
Arlington, Va. 22202
No Drawing. Continuation-in-part of application Ser. No. 292,448, Feb. 12, 1973. This application Mar. 20, 1973, Ser. No. 343,003
Int. Cl. C08f 41/02, 41/06, 45/34
U.S. Cl. 260—33.4 R
7 Claims

ABSTRACT OF THE DISCLOSURE

A glazing composition comprises three resin ingredients and three solvent ingredients and possesses hardness, adhesion, resistance and clarity characteristics quite remarkable by comparison to ostensibly similar compositions. The resin ingredients are styrene-butadiene resin, styrene-butyl acrylate resin, and methoxy methyl melamine resin. The solvent ingredients are toluene, xylene and isopropanol. The ingredients are combined in such a manner to form a clear liquid mix capable of air drying or high temperature drying into a hard film having the characteristics of glass, being highly resistant to scratches, abrasion, and ultra violet light. The composition thus is eminently suitable as a room temperature glaze.

This is a continuation-in-part of application Ser. No. 292,448, filed Feb. 12, 1973.

BACKGROUND OF THE INVENTION

This invention relates to resin coating compositions. In particular, it relates to such compositions which are of high gloss and highly resistant to abrasion. Still more particularly, the invention relates to such compositions useful as a glaze. Even more particularly, the invention relates to such glaze compositions capable of being cured at room temperature.

There has been a need for some time for a glaze composition that can be cured at low temperature, particularly room temperature. A great many such compositions have been developed, particularly resin compositions, but they suffer from various serious disadvantages such as low gloss, poor abrasion resistance, poor resistance to ultraviolet light, and the like. Further, such compositions frequently require a high temperature cure.

It is an object of the present invention to provide a novel resin coating composition. It is still a further object to provide a resin coating composition useful as a glaze. It is still a further object to provide such a glaze composition which is curable at room temperature. It is still a further object to provide such a glaze composition which overcomes disadvantages associated with known resin glaze compositions.

BRIEF SUMMARY OF THE INVENTION

The foregoing and other objects which will be apparent to those having ordinary skill in the art are achieved by the present invention by providing a composition including a normally solid styrene-butadiene copolymer resin, the styrene content of which is from 80 to 95 percent by weight and the butadiene content of which is from 5 to 20 percent by weight, a normally solid styrene-butyl acrylate copolymer resin, the styrene content of which is from 45 to 90 percent by weight and the butyl acrylate content of which is correspondingly from 10 to 55 percent by weight, a water soluble methoxy methyl melamine formaldehyde resin, the melamine content of which is from 50 to 75 percent by weight and the formaldehyde content of which is correspondingly 50 to 25 percent by weight, and a solvent comprising toluene, xylene, and isopropanol.

DETAILED DESCRIPTION

The coating composition is made by combining two components: one containing the styrene copolymer resins, toluene and xylene, and other containing the melamine formaldehyde resin and isopropanol. Both of these, as well as the final composition itself, have excellent shelf life. The coating composition is made by adding the latter component to the former. It is preferred to add the latter slowly to minimize the formation of fish eyes and to facilitate obtaining a clear and homogeneous solution. My experiments have shown that compositions within the scope of the invention have properties which are quite remarkable in comparison with other and ostensibly similar compositions. While the nature of the composition can vary somewhat, as disclosed herein, in general I believe that the formulation is critical since essentially useless results have been obtained with compositions which are superficially similar.

The first component has four ingredients: styrene-butadiene resin, styrene-butyl acrylate resin, toluene, and xylene. The resins are preferably provided in the form of finely divided particles to facilitate dissolving or dispersion in the solvent. I purposely state that the solid resin is dissolved or dispersed in the solvent for several reasons. First, I believe that a clear, homogeneous, dispersion of finely divided resin particles is operable. The important factor is not whether the resins "dissolve" within the technical meaning of that term, rather it is that the composition is clear and homogenous. Both of these conditions can be realized without forming a true "solution." However, I believe that some true dissolving of the resin takes place and therefore I do not wish to be limited to a dispersion. In any event, as stated above, the essential thing is to provide a clear and homogeneous composition and the ingredients will be the controlling factors: that is, by utilizing the present polymers and "solvents," a clear and homogeneous solution is obtainable.

The styrene-butadiene resin can be any normally solid conventional styrene-butadiene resin. Molecular weights are typically 200,000–400,000 or more. Preferably, the styrene content is from 80 to 95 percent by weight, and still more preferably 85 to 90 percent by weight. The butadiene content is preferably 5 to 20 percent by weight and more preferably 10 to 15 percent by weight. The resin may optionally contain up to 10 percent by weight, preferably not more than 5 percent, of units from another conventional ethylenically unsaturated copolymerizable monomer, provided that the amount of any such copolymerizable monomer is not more than one half of the amount of butadiene.

The styrene-butyl acrylate copolymer is also a conventional, normally solid resin and preferably contains from 45 to 90 percent by weight styrene units and from 10 to 55 percent by weight butyl acrylate units. The resin may optionally contain up to 20 percent by weight, preferably not more than 5 percent by weight, of units from another conventional ethylenically unsaturated copolymerizable monomer, provided that the amount of any such copolymerizable monomer is not more than one half of the amount of the butyl acrylate.

The amounts of the ingredients in the first component are as follows:

| Ingredient | Amount, parts by weight | |
|---|---|---|
| | Broad | Preferred |
| Styrene-butadiene resin | 7–13 | 9–11 |
| Styrene-butyl acrylate resin | 13–21 | 16–18 |
| Toluene | 24–42 | 28–38 |
| Xylene | 19–32 | 22–29 |

The second component has two ingredients: methoxy methyl melamine formaldehyde resin and isopropanol. The melamine-formaldehyde resin is readily available as a solution containing 80 percent solids and 20 percent solvent, normally an alcoholic solution. In any event, the water soluble resin is dissolved or dispersed in isopropanol. Again the essential factor is to provide a clear homogeneous composition. The resin is quite soluble in isopropanol and I believe this component of the invention to be a true solution. However, I have retained the alternative terminology "dispersion or solution" because I do not wish to be bound to any particular theory in this respect. The resins are commercially available and are the subject of several United States Patents including U.S. Pat. Nos. 3,059,027; 3,392,150; and 3,394,093. The resin includes 30 to 45 percent formaldehyde content and from 55 to 70 percent melamine content. The composition includes 45 to 55 percent by weight of the melamine formaldehyde resin and 65 to 45 percent by weight isopropanol.

The first and second components have excellent shelf life and are combined to make a room temperature curable glaze composition which itself has excellent shelf life in a conventional container. The amount of the second component which is added is generally from 5 to 20 parts by weight per 90 parts by weight of the first component. The ultimate composition thus formulated has the following composition:

| Ingredient | Amount, parts by weight | | |
|---|---|---|---|
| | Broad | Preferred | Most preferred |
| Styrene-butadiene resin | 7–13 | 9–11 | ca. 10 |
| Styrene-butyl acrylate resin | 13–21 | 16–18 | ca. 17 |
| Melamine formaldehyde resin | 3.8–7.0 | 4.4–6.4 | ca. 5.4 |
| Toluene | 24–42 | 28–38 | ca. 33 |
| Xylene | 19–32 | 22–29 | ca. 26 |
| Isopropanol | 5–8.5 | 6–7.5 | ca. 6.6 |

One of the principal uses of the invention is for the repair of pottery and ceramics which would be damaged if subjected to normal glaze firing temperatures. To this end, it is frequently desirable to incorporate a pigment in the compositon to match the artcle beng repared. Further, in instances where the glaze is used as such, it may be desirable to incorporate a pigment. Accordingly, it is contemplated to incorporate any conventional compatible pigment in the composition and this may be provided in the first component and/or the second component and/or the ultimate composition.

The examples which follow illustrate formulation and use of compositions in accordance with the invention and failure experienced with a similar composition.

EXAMPLE 1

Finely divided particles of a solid, styrene butadiene (85% styrene, 15% butadiene) copolymer (50 grams) and 150 grams of a solid styrene-butyl acrylate (90% styrene, 10% butyl acrylate) copolymer particles are dispersed in a mixture of 300 grams of toluene and 235 grams of xylene and stirred to form a clear and homogeneous dispersion or solution of the polymer in the solvents. Seventy grams (80% solids, balance isopropanol/isobutanol:1/1) of water soluble methoxy methyl melamine formaldehyde resin (63% melamine, 37% formaldehyde) (Uformite MM83, Rohm & Haas) are dissolved in 50 grams of isopropanol. Both of these solutions exhibit excellent shelf life.

The latter solution is added slowly to the former with stirring to form a clear and homogeneous resin-containing solution. This solution has excellent shelf life in a container, but when formed into a film, it will air dry at room temperature to form a clear, glossy, hard film having excellent adhesion to various surfaces including metal, wood, ceramics, glass, plastics (including plastics which are difficult to adhere to such as polycarbonates). The resin composition cures without heating or baking of any kind into a film which is impervious to water and is highly resistant to the action of solvents and ultra violet radiation. Methyl ethyl ketone, methyl dichloride, chloroform and xylene have virtually no noticeable effect on the film. Moreover, the film can be subjected to high temperature and will become harder, but will not become brittle or striate. The material is successfully applied as a glaze coating to ceramics, wood, glass, metal and plastics.

On drying at room temperature, the syrupy glaze composition hardens to a solid, glass-like substance in a few hours and the solvents rapidly evaporate. The coatings can be heated to accelerate curing or it may be desirable for some other reason to heat treat the article to which the glaze has been applied. In either event, it is preferred to remove the bulk of the solvents, for example, by gentle heating, say up to 100 or 150° C., prior to subjecting the glaze to high temperatures.

In many applications oil coloring (artist's paints) or pigments or other coloring may be added to produce an appearance matching that of the item being glazed, coated, or repaired, or modified.

The final product is exceptionally hard and strong compared to previous glazes (which do not have the adhesive qualities of the present glaze). The product has an extremely low coefficient of friction which matches that of glass, and the finished item does not tend to develop internal stresses and consequent failure. The outerfinish has the lustrous appearance of glass, and does not discolor from exposure to sunlight or weather.

EXAMPLE 2

A composition is made up as in Example 1 except that a styrene-ethyl acrylate (90/10) resin is substituted for the styrene-butyl acrylate (90/10) resin of Example 1. A clear and homogeneous composition cannot be prepared.

What is claimed is:

1. A room temperature curable composition comprising a clear and homogeneous liquid blend of:
    (a) from 7 to 13 parts by weight of a normally solid styrene-butadiene copolymer resin, the styrene content of which is from 80 to 95% by weight and the butadiene content of which is from 5 to 20% by weight;
    (b) from 13–21 parts by weight of a normally solid styrene-butyl acrylate copolymer resin, the styrene content of which is from 45 to 90% by weight and the butyl acrylate content of which is correspondingly from 10 to 55% by weight;
    (c) from 3.8 to 7.0 parts by weight of a water soluble methoxy methyl melamine formaldehyde resin, the melamine content of which is from 50 to 75% by weight and the formaldehyde content of which is correspondingly 50 to 25% by weight; and
    (d) from 24 to 42 parts by weight of a solvent comprising toluene;
    (e) from 19 to 32 parts by weight of xylene; and
    (f) from 5–8.5 parts by weight of isopropanol.

2. A composition according to claim 1 wherein the solvent comprises from 50 to 75% by weight of the composition.

3. A composition according to claim 1 wherein the amounts of the ingredients are as follows:

| Ingredient: | Parts by weight |
|---|---|
| Styrene-butadiene copolymer | 9–11 |
| Styrene-butyl acrylate copolymer | 16–18 |
| Melamine formaldehyde resin | 4.4–6.4 |
| Toluene | 28–38 |
| Xylene | 22–29 |
| Isopropanol | 6–7.5 |

4. A composition according to claim 1 wherein the amounts of the ingredients are as follows:

| Ingredient: | Parts by weight (about) |
|---|---|
| Styrene-butadiene copolymer | 10 |
| Styrene-butyl acrylate copolymer | 17 |
| Melamine formaldehyde resin | 5.4 |
| Toluene | 33 |
| Xylene | 26 |
| Isopropanol | 6.6 |

5. A composition according to claim 1 further including a pigment.

6. A two-component composition for making a room-temperature curable glaze composition by combining the two components and comprising:
(a) a homogeneous dispersion or solution containing from 7–13 parts by weight of a normally solid styrene-butadiene resin, the styrene content of which is from 80 to 95% by weight and the butadiene content of which is from 5 to 20% by weight, from 13–21 parts by weight of a normally solid styrene-butyl acrylate resin, the styrene content of which is from 45 to 90% by weight and the butyl acrylate content of which is correspondingly from 10 to 55% by weight, from 24–42 parts by weight of toluene, and from 19–32 parts by weight of xylene; and
(b) a homogeneous dispersion or solution containing from 45 to 55 parts by weight of a water soluble methoxy methyl melamine formaldehyde resin the melamine content of which is from 50 to 75% by weight and the formaldehyde content of which is correspondingly from 25 to 50% by weight and from 45–65 parts by weight of isopropanol.

7. A two component composition according to claim 6 wherein the second component is present in an amount of from 5 to 25 parts by weight to 90 parts by weight of the first component.

References Cited
UNITED STATES PATENTS

| | | | |
|---|---|---|---|
| 2,768,563 | 10/1956 | Immerman | 94—22 |
| 2,769,711 | 11/1956 | Wilson | 92—21 |
| 2,789,096 | 4/1957 | Bruno et al. | 260—4 |
| 2,840,492 | 6/1958 | Emerson | 117—140 |
| 2,852,476 | 9/1958 | Cummings | 260—21 |
| 2,967,162 | 1/1961 | Vasta | 260—21 |
| 3,068,183 | 12/1962 | Strolle | 260—21 |
| 3,110,413 | 11/1963 | McKay et al. | 220—64 |
| 3,223,655 | 12/1965 | Murdock | 260—4 |

ALLAN LIEBERMAN, Primary Examiner

T. DEBENEDICTIS, Sr., Assistant Examiner

U.S. Cl. X.R.

260—32.6 N, 33.6, 852, 855, 856, 892